United States Patent [19]
Calvert et al.

[11] Patent Number: 5,328,021
[45] Date of Patent: Jul. 12, 1994

[54] ADJUSTABLE FLIGHT BARS FOR PACKAGING MACHINE

[75] Inventors: Rodney K. Calvert, Dunwoody; Alton J. Fishback, Austell; George R. Vanhorne, Atlanta, all of Ga.

[73] Assignee: The Mead Corporation, Dayton, Ohio

[21] Appl. No.: 108,918

[22] Filed: Aug. 19, 1993

Related U.S. Application Data

[63] Continuation-in-part of Ser. No. 5,349, Jan. 19, 1993, abandoned.

[51] Int. Cl.$^5$ .............................................. B65G 47/86
[52] U.S. Cl. .............................. 198/803.11; 198/626.5; 198/731
[58] Field of Search .................. 198/626.5, 717, 725, 198/726, 731, 803.11, 803.13

[56] References Cited

U.S. PATENT DOCUMENTS

| | | | |
|---|---|---|---|
| 2,637,958 | 5/1953 | Lippmann et al. | 198/626.5 X |
| 3,325,977 | 6/1967 | Kirsten | 198/803.11 |
| 3,340,996 | 9/1967 | Cerf | 198/803.11 |
| 3,857,474 | 12/1974 | Hutson | 198/626.5 |
| 4,365,456 | 12/1982 | Ullman | 53/69 |
| 4,718,540 | 1/1988 | Greenwell | 198/803.11 X |
| 4,893,707 | 1/1990 | Langen et al. | 198/803.13 X |
| 5,065,670 | 11/1991 | Leiweke | 198/731 X |
| 5,241,806 | 9/1993 | Ziegler et al. | 53/566 |

Primary Examiner—James R. Bidwell
Attorney, Agent, or Firm—Rodgers & Rodgers

[57] ABSTRACT

A system of flight bars each flight bar having a leading component and a trailing component, a first pair of endless driving elements interconnected with each leading component and a second pair of spaced apart endless driving elements interconnected with each trailing component. Controlled relative movement is imparted to the first and second pair of endless driving elements so as to vary the distance between the trailing component of a flight bar and the leading component of an immediately succeeding flight bar thereby to render the system adaptable for use in conjunction with packages of different horizontal dimensions in the direction of movement of the flight bars.

13 Claims, 6 Drawing Sheets

5,328,021

ADJUSTABLE FLIGHT BARS FOR PACKAGING MACHINE

This is a continuation-in-part of U.S. patent application Ser. No. 08/005,349 filed Jan. 19, 1993.

TECHNICAL FIELD

This invention relates to the packaging of articles such as cans or bottles into end loading sleeve type cartons and is concerned more particularly with an arrangement for quickly and efficiently varying the distance between a leading flight bar component and a trailing flight bar component so as to render the system easily adjustable for use with packages of different horizontal dimensions in the direction of movement of the packages.

BACKGROUND ART

U.S. Pat. No. 4,237,673 issued Dec. 9, 1980 and owned by the assignee of this invention discloses an arrangement wherein open ended sleeve type cartons are moved along a predetermined path and wherein certain containers are fed at an acute angle to the path of movement of the cartons by transverse flight bars which are provided with wedge shaped end portions to facilitate function of the flight bars as efficient means for driving the incoming items inwardly toward the path of movement of the open ended cartons so as to load the articles into one or both ends of the carton.

U.S. Pat. No. 5,176,612 issued Jan. 5, 1993 and owned by the assignee of this invention discloses a machine for feeding open ended sleeve type cartons from a hopper and for manipulating such cartons into set up condition and thereafter for depositing the cartons on to conveyor means having transverse flight bars engageable with the leading and trailing parts of the set up cartons.

SUMMARY OF THE INVENTION

According to this invention in one form, open ended sleeve type cartons after being set up into open ended condition are deposited between movable flight bars each having a leading component and a trailing component, a first pair of spaced apart endless driving elements are interconnected with each of said leading components and a second pair of spaced apart endless driving elements are interconnected with each of said trailing components and means for imparting controlled relative movement to said first and second pair of endless driving elements so as to vary the distance between the trailing component of a flight bar and the leading component of an immediately succeeding flight bar thereby to render this system adaptable for use in conjunction with packages of different horizontal dimensions in the direction of movement of the flight bars along a predetermined path.

By this invention means for interrelating the leading and trailing components is provided so as to accommodate relative movement therebetween within a predetermined range.

By this means a packaging machine is easily converted for use with cartons whose horizontal dimensions in the direction of movement are different and such conversions may be made in a matter of a few minutes.

In order to adapt presently known flight bar systems for use in conjunction with packages of different horizontal dimensions in the direction of package movement it has been necessary either to remove existing flight bars from the machine to replace such bars by other flight bars whose dimensions are such as to render the system efficiently operable with the replaced flight bars having different dimensions and tip angles than the replaced flight bars. Similarly in order to increase the spacing between adjacent flight bars it may be possible to adapt the system of flight bars for changes, additional flight bar components may take the form of a strip added to the flight bars which renders the system usable with small packages and the additional components may be removed individually from all the flight bars in order to render the system usable with packages of greater transverse dimensions in the direction of movement of the packages.

Either of these known methods of adapting a machine for use for different size packages is very time consuming and expensive and requires the services of a knowledgeable operator or mechanic.

Assuming that the flight bars are used in conjunction with systems such as are disclosed in the aforementioned U.S. Pat. No. 4,237,673, the angle of contact between incoming items to be packaged and the structure interconnecting leading and trailing flight bar elements must be accommodated.

BEST MODE OF CARRYING OUT THE INVENTION

Figure 1:
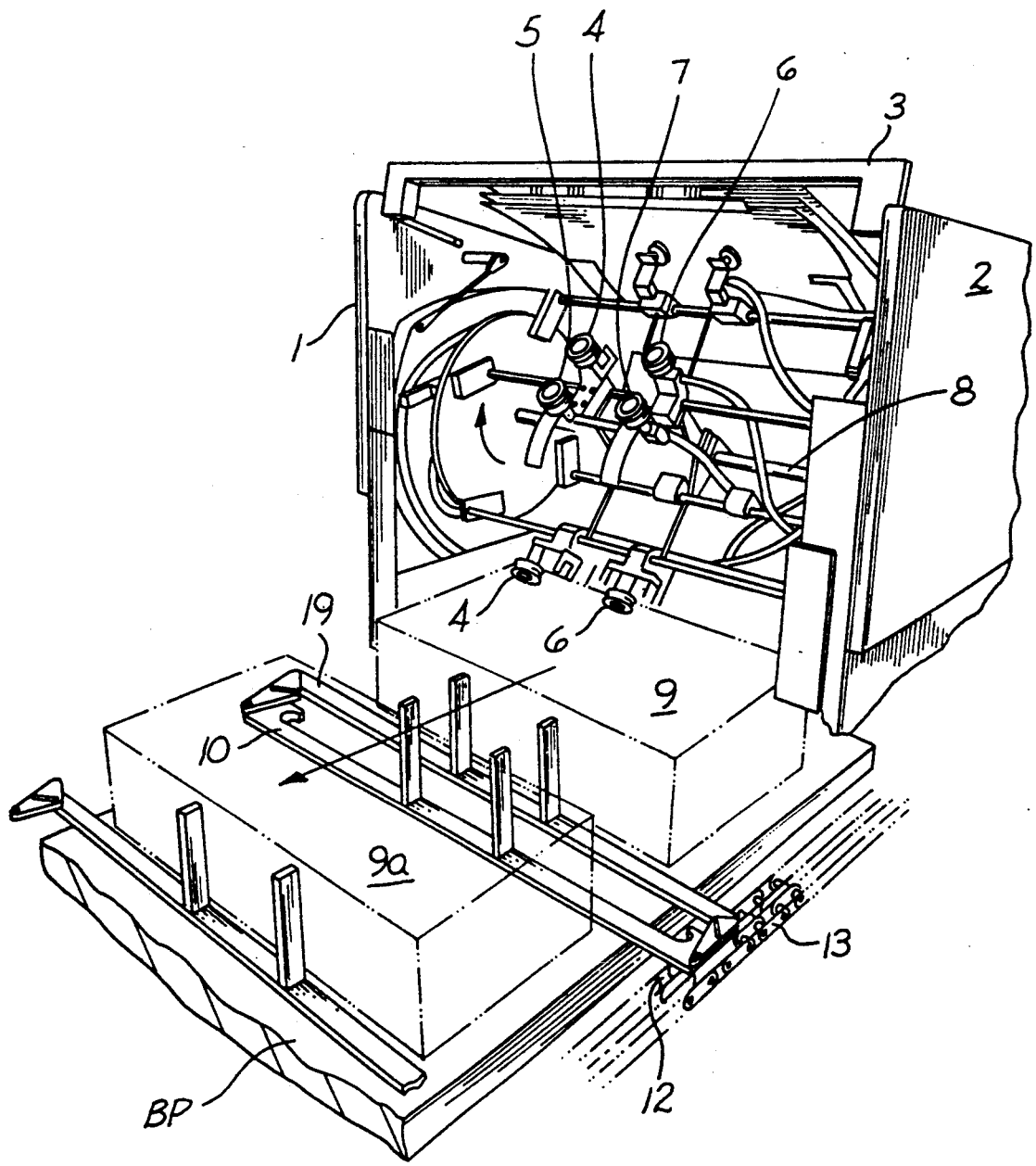
FIG. 1 is a perspective view of a packaging machine similar to that disclosed in the aforementioned U.S. Pat. No. 5,176,612.

The structure shown in FIG. 1 is similar in many respects to FIG. 1 of the aforementioned U.S. Pat. No. 5,176,612.

In FIG. 1 a pair of side frame support panels 1 and 2 are disclosed and the lower portion of a hopper disposed atop the cross bar 3 is shown in conjunction with a few collapsed cartons which are to be withdrawn from the hopper and set up into open ended condition by suction cups such as 4, 5, 6 and 7 which are rotatable about main shaft 8 to engage and withdraw the lowermost carton from the hopper and to manipulate the carton panels into set up condition as best shown in the aforementioned U.S. Pat. No. 5,176,612 issued Jan. 5, 1993. The cartons 9 and 9a are separated by a flight bar formed according to this invention and which includes a leading component 10 and a trailing component 19. The leading component is driven by a pair of endless driving elements one of which is designated by the numeral 13 and the other of which is not shown in FIG. 1. Similarly trailing component 19 is movable by virtue of its association with endless driving element 12 and by a similar driving element not shown in FIG. 1 but which cooperates with the opposite end of trailing component 19.

Means for interrelating the leading and trailing components is provided so as to accommodate relative movement therebetween within a predetermined range.

Figure 2:
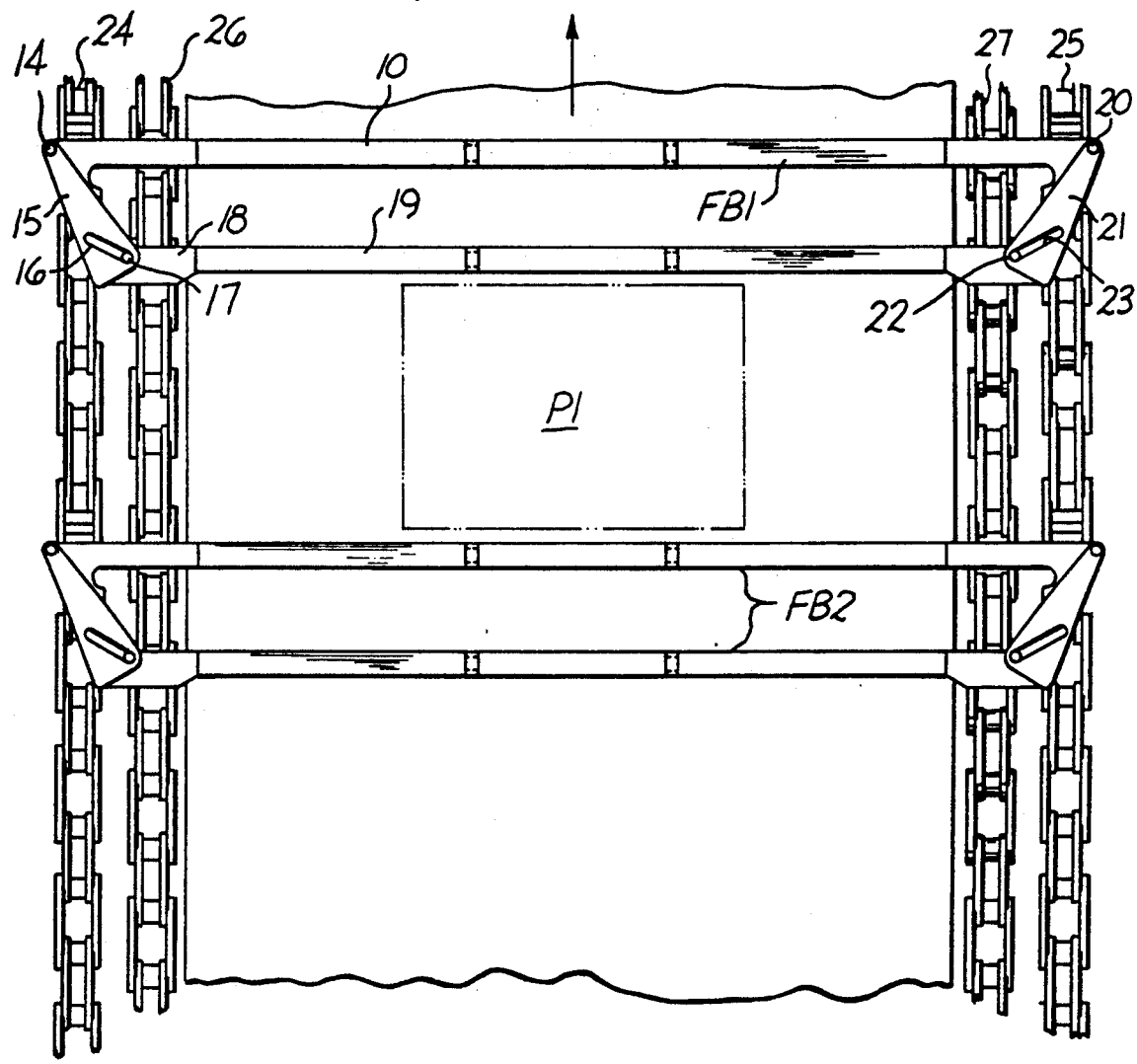
FIG. 2 is a plan view of a pair of flight bars each formed according to this invention and wherein the parts are arranged so as to render the system usable with relatively small packages having small dimensions in the direction of movement of the flight bars.

Leading component 10 as best shown in FIG. 2 is pivotally mounted at pivot 14 to end plate 15 having a slot 16 formed therein which receives a pin 17 secured to the end part 18 of trailing component 19. The right hand end of leading component 10 of flight bar FB1 is pivotally connected at pivot 20 to end plate 21. A pin 22 is mounted on the right hand end of trailing component 19 and is arranged so that pin 22 rides in slot 23 formed in end plate 21. Leading component 10 of FB1 is secured to endless driving elements 24 and 25. The second flight bar designated FB2 is driven by endless driving elements 26 and 27.

Figure 3:
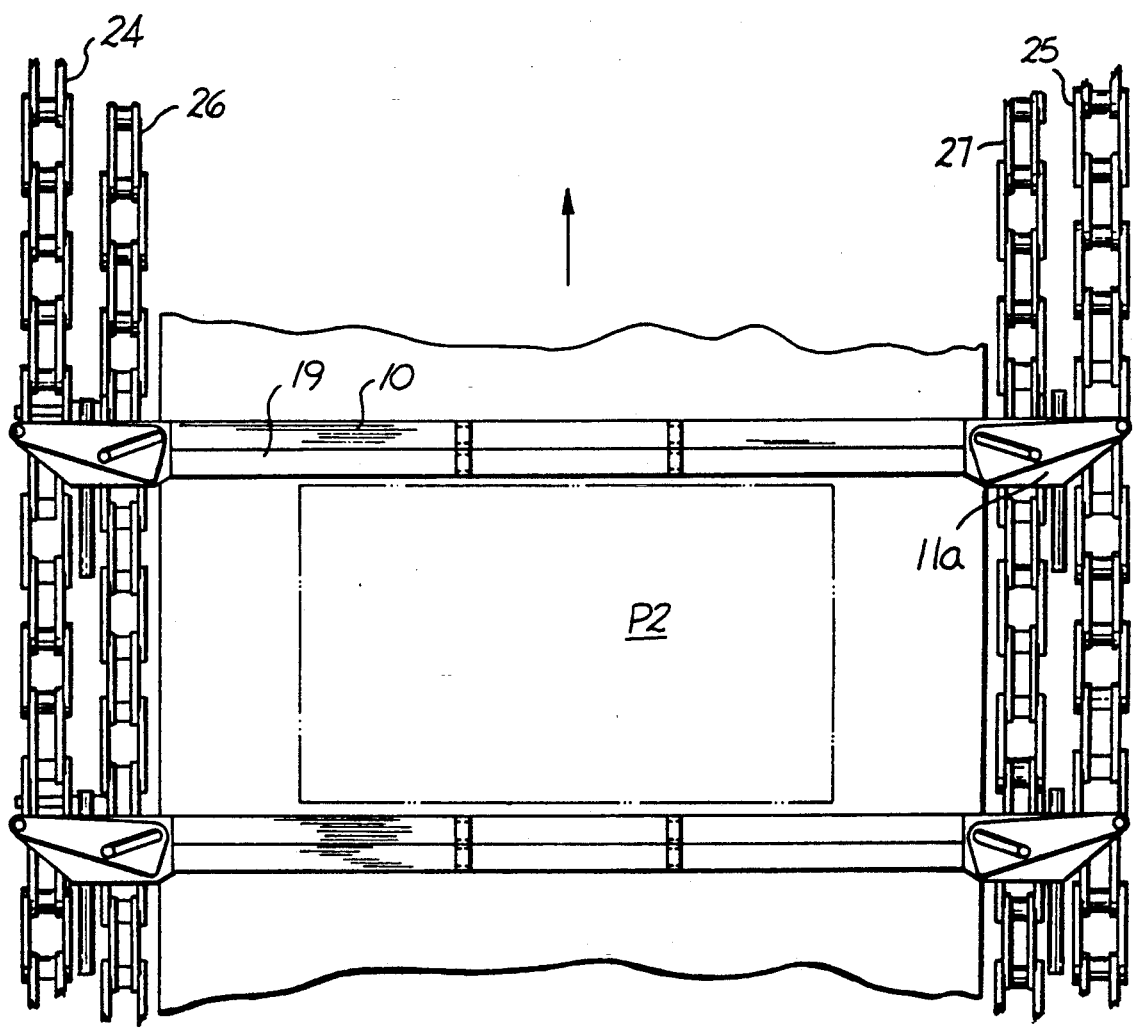
FIG. 3 is a view similar to FIG. 2 but shows the parts in which the leading and trailing components are disposed in face contacting relation with each other thereby to render the flight bars usable in connection with packages of relatively large dimensions in the direction of movement of the flight bars.

In order to convert the structure shown in conjunction with FB1 in FIG. 2 for use in conjunction with the larger package P2 as shown in FIG. 3, the endless elements 24 and 25 are operated in conjunction with endless elements 26 and 27 so as to cause leading components 10 to become disposed in parallel contacting relation with the trailing component 19 thereby to adapt the structure as shown in FIG. 2 for use with a package P2 as shown in FIG. 3. Obviously this adjustment of the machine is effected in an efficient and rapid manner.

Figure 4:
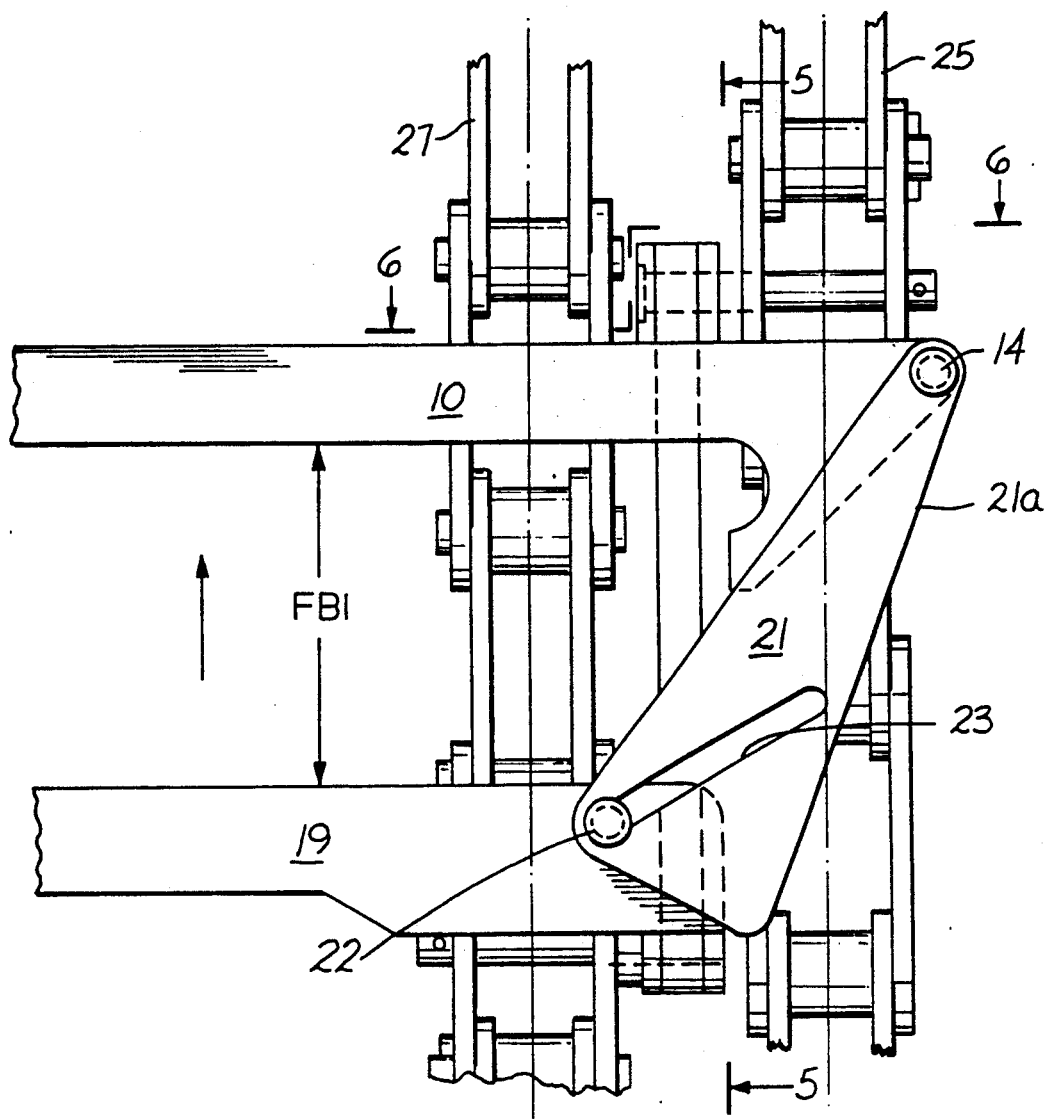
FIG. 4 is an enlarged view of the end portion of a leading and trailing component together with associated structure such as that shown in FIG. 2.
Figure 5:
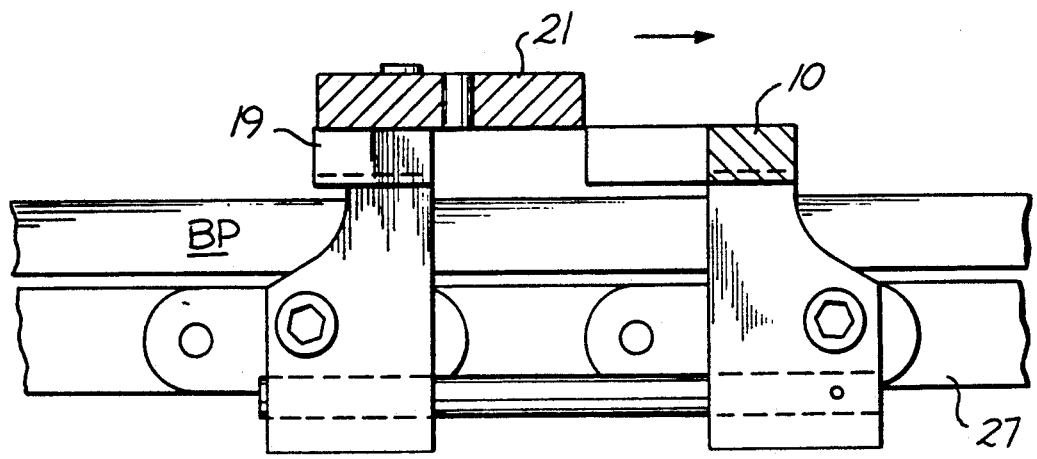
FIG. 5 is a cross sectional view taken along the lines 5—5 as shown in FIG. 4.
Figure 6:
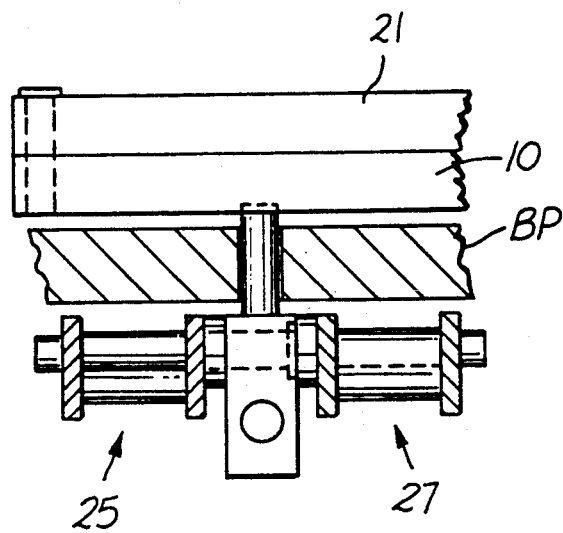
FIG. 6 is a cross sectional view of structure taken along the line designated 6—6 in FIG. 4.

As is shown in FIG. 3, the edge 11a of the end part of trailing component 19 is formed for proper engagement with rows of incoming articles which are moving at an acute angle into the path of movement of the flight bars as shown and described in the aforementioned U.S. Pat. No. 4,237,673. The proper angle of engagement is provided by surface 21a in FIG. 4.

Figure 7:
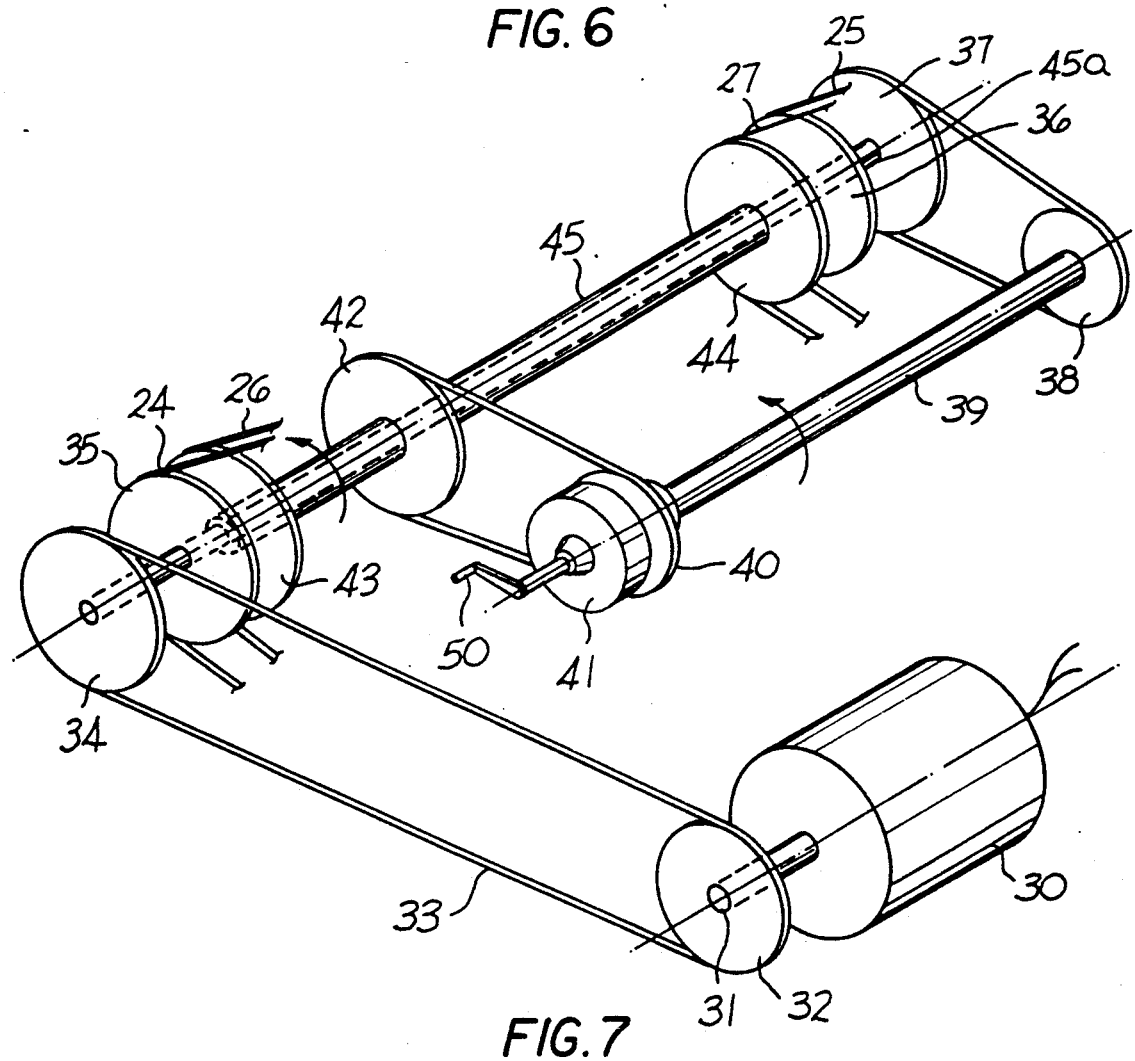
FIG. 7 is a schematic representation of the system components.
Figure 8:
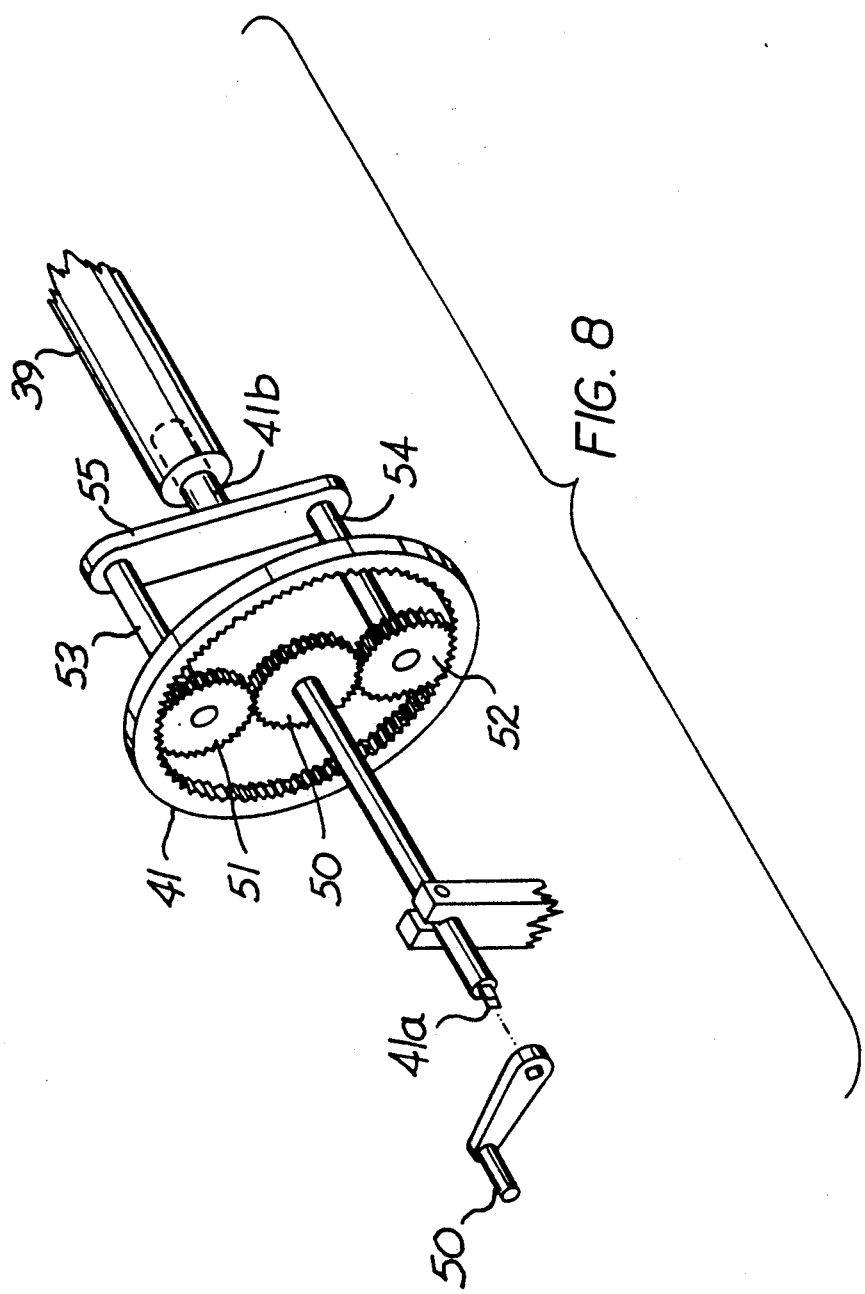
FIG. 8 is a schematic representation of a known form of a speed reducer which functions as does the gear box 40.

Simple and easy manipulation of the endless driving elements is imparted by the arrangement shown in FIGS. 7 and 8. As shown in FIG. 7, driving motor 30 is arranged through its shaft 31 and the sprocket 32 mounted on shaft 31 to drive the driving chain 33 so as to impart rotary motion to driving sprocket 34. The driving sprocket 34 drives sprockets 35, 36 and 37 and chains 24 and 25 through inner shaft 45a. Sprocket 37 drives sprocket 38 shaft 39 and output shaft 41b of gear box 41.

If input shaft 41a to gear box 41 is secured against rotation by a clamping bearing then shafts 45 and 45a rotate together with no relative rotation therebetween. Of course, this establishes a static relationship wherein the chains 24 and 25 do not move relative to chains 26 and 27 and thus the trailing components of each flight bar are held in fixed relation relative to their associated flight bars.

When it is desired to condition the system for use in conjunction with the structure shown in FIG. 3 from that shown in FIG. 2, the clamped condition of input shaft 41a is relieved by loosening the bolt which clamps the input shaft 41a against rotation so as to permit rotation. The degree of rotation is effected by means of the manually operable crank 50. Schematically represented FIG. 8 constitutes a representation of the internal parts of gear box 41 and with reference to FIG. 8 includes a ring gear 41, a sun gear 50 and planetary gears 51 and 52. Rotation of input shaft 41a then causes planetary gears 51 and 52 to rotate about the sun gear 50 and through shafts 53 and 54 together with cross member 55 which is secured to output shaft 41b causes the shaft 39 to rotate. Rotation of shaft 39 causes rotation of sprockets 38 and 37 and shaft 45a relative to shaft 45. Shafts 45 and 45a as is apparent from FIG. 7 rotate sprockets 35 and 36 which in turn control the movement of chains 24 and 25 thus effecting a shift in position as from that indicated in FIG. 2 for example to that indicated in FIG. 3. Once the desired shift in position of the trailing components of the flight bars is effected clamping bearing is tightly secured about input shaft 41a thus precluding further rotation of 41a and causes shafts 45 and 45a to rotate together without any relative rotation therebetween. This restores the flight bars in the desired position relative to the driving chains such as 26 and 27.

Simple and easy manipulation of the endless driving elements is imparted by the arrangement shown in FIG. 7. As shown in FIG. 7, driving motor 30 is arranged through its shaft 31 and the sprocket 32 mounted on shaft 31 to drive the driving chain 33 so as to impart rotary motion to driving sprocket 34. The driving sprocket 34 drives sprockets 35, 36 and 37 and chains 24 and 25 through inner shaft 45a. Thus sprocket 37 drives sprocket 38, shaft 39 and output shaft 41b of gear box 41. Input shaft 41a of gear box 41 is normally restrained as by crank 50. This causes sprocket 40 which is attached to gear box 41, to rotate but at slightly different speed from shaft 39 thus driving sprocket 42 which is connected to sprockets 43 and 44 and chains 26 and 27 by virtue of the action of hollow shaft 45.

The ratio of the gear box 41 that causes 39 and 40 to rotate at different speeds is compensated for by the difference in the number of teeth on sprocket 38 and sprocket 40 thus causing hollow shaft 45 to rotate at the same speed as the inner shaft.

A speed reducer such as gear box 40 is sold under the trademark S. M. Cyclo by Machinery Corporation of America located at 7 Malcom Avenue, Teterboro, N.J. 07608.

In order to impart simultaneous movement to all of the trailing components such as 19 relative to all of the leading components such as 10 appropriate rotation of manually operated control such as crank 50 is effected. Therefore rotation of crank 50 imparts movement to trailing components 19 through chains 26 and 27 so as to effect rapid and efficient adaptation of the flight bars for use in conjunction with packages having a wide variety of dimensions in the direction of movement of the packages. Flight bar plates 20 and 21 also move to change the angle of engagement with the incoming product thus to insure a constant speed of the incoming items prior to engagement with the flight bars.

We claim:

1. A system including flight bars for advancing packages in sequence along a predetermined path each of said flight bars having a leading component and a trailing component, a first pair of spaced apart endless driving elements interconnected with each of said leading components and a second pair of spaced apart endless driving elements interconnected with each of said trailing components, said first and said second pairs of endless driving elements being movable in synchronism so as to impart movement to packages along said predetermined path, means for imparting controlled relative movement to said first and said second pairs of endless driving elements so as to vary the distance between the trailing component of a flight bar and the leading component of an immediately succeeding flight bar thereby to render the system adaptable for advancing packages of different horizontal dimensions in the direction of movement of the flight bars along said predetermined path, and characterized by means for interrelating said leading and trailing components to accommodate relative movement therebetween within a predetermined range, an end plate pivotally connected with each of said flight bar leading components near each end thereof and a pin secured to each of said trailing components near each end thereof and wherein each of said end plates includes a slot in which the adjacent pin is slidably disposed.

2. A system according to claim 1 wherein means for causing the angle engagement to incoming products to change to insure constant speed of the moving items prior to engagement with the flight bars.

3. A system according to claim 1 wherein each end of each of said leading components is configured in the form of the correct metering angle for product entry into the space between adjacent flight bars.

4. A system according to claim 1 wherein said slot is disposed at an angle which results in the disposition of said end plate in such a position that an edge of said end plate forms the correct metering angle for product entry into the space between adjacent flight bars.

5. A system including flight bars for advancing packages in sequence along a predetermined path each of said flight bars having a leading component and a trailing component, a first pair of spaced apart endless driving elements interconnected with each of said leading components and a second pair of spaced apart endless driving elements interconnected with each of said trailing components, said first and said second pairs of endless driving elements being movable in synchronism so as to impart movement to packages along said predetermined path, and motive means including a driving motor, interconnected with linkage means and with a gear box having rotatable input and output shafts, said output shaft being connected with said linkage means, and means for securing said input shaft against rotation thereby to cause said linkage means to maintain synchronous movement of said pairs of endless driving elements so as to prevent undesired changes in the space relations of said flight bars.

6. A system according to claim 5 wherein said means for securing said input shaft against rotation is rendered ineffective.

7. A system according to claim 6 wherein control means is effective to impart rotation to said input shaft of said gear box thereby to establish movement to parts of said linkage which control the relative positions of said endless driving elements thereby to control the distance of a first flight bar component relative to a second flight bar component.

8. A system according to claim 7 wherein said control means includes crank means.

9. A system according to claim 8 wherein said crank means includes a manually operable crank.

10. A system according to claim 5 wherein the housing of said gear box is rotatable with its output shaft while said input shaft is secured against movement.

11. A system according to claim 6 wherein rotation of said input shaft imparts movement to parts of said linkage which control the position of one pair of said endless driving elements relative to the other pair of driving elements.

12. A system according to claim 11 wherein the position of said one pair of endless elements relative to the other pair of endless elements may be controlled both during operation of the system or during down time.

13. A system including flight bars for advancing packages in sequence along a predetermined path each of said flight bars having a leading component and a trailing component, a first pair of spaced apart endless driving elements interconnected with each of said leading components and a second pair of spaced apart endless driving elements interconnected with each of said trailing components, said first and said second pairs of endless driving elements being movable in synchronism so as to impart movement to packages along said predetermined path, means for imparting controlled relative movement to said first and said second pairs of endless driving elements so as to vary the distance between the trailing component of a flight bar and the leading component of an immediately succeeding flight bar thereby to render the system adaptable for advancing packages of different horizontal dimensions in the direction of movement of the flight bars along said predetermined path, and means for interconnecting said leading and trailing components with each other to limit relative movement therebetween within a predetermined range.

* * * * *